(12) United States Patent
Zach et al.

(10) Patent No.: US 9,194,416 B2
(45) Date of Patent: Nov. 24, 2015

(54) SELF-DRILLING SCREW AND USE THEREOF

(71) Applicant: SFS intec Holding AG, Heerbrugg (CH)

(72) Inventors: Marco Zach, Diepoldsau (CH); Peter Schmid, Widnau (CH); Rene Dutler, Eichberg (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 14/398,795

(22) PCT Filed: May 2, 2013

(86) PCT No.: PCT/EP2013/059102
§ 371 (c)(1),
(2) Date: Nov. 4, 2014

(87) PCT Pub. No.: WO2013/167451
PCT Pub. Date: Nov. 14, 2013

(65) Prior Publication Data
US 2015/0139751 A1    May 21, 2015

(30) Foreign Application Priority Data

May 10, 2012   (DE) .................. 10 2012 009 400

(51) Int. Cl.
*F16B 25/10* (2006.01)
*F16B 25/00* (2006.01)
*F16B 33/06* (2006.01)

(52) U.S. Cl.
CPC ........... *F16B 25/103* (2013.01); *F16B 25/0021* (2013.01); *F16B 25/106* (2013.01); *F16B 33/06* (2013.01); *Y10T 29/49963* (2015.01)

(58) Field of Classification Search
CPC ...... F16B 25/10; F16B 25/103; F16B 25/106; F16B 25/0021; F16B 33/06
USPC ....................................... 411/914, 386
See application file for complete search history.

(56) References Cited

U.S. PATENT DOCUMENTS 2,122,915 A * 7/1938 Olson ........................ 411/386
(Continued)

FOREIGN PATENT DOCUMENTS

| DE | 3235447 | 5/1983 |
| DE | 2502284 | 10/1988 |
| DE | 19913273 | 9/2000 |

(Continued)

OTHER PUBLICATIONS

Machine-generated translation of DE 20 2009 011 665 Jan. 2010.*

*Primary Examiner* — Flemming Saether
(74) *Attorney, Agent, or Firm* — Volpe and Koenig, P.C.

(57) ABSTRACT

A self-drilling screw made of an austenitic or other stainless steel, is provided having a drilling tip. The shank is integrally formed of an austenitic or other stainless steel and has a galvanically applied thin coating at least in the tip region, with the coating being harder than a non-coated region. The thin coating has a pearl-like or columnar surface, a coating thickness of at least 2 μm and a hardness in a range of from 500 to 1500 HV0.3. The self-drilling screw can be produced more simply than a typical self-drilling screw, in which the drilling tip consists of a harder material than the shank and is welded to the shank made of stainless steel. The coating ensures the drilling capacity and thread formation.

8 Claims, 3 Drawing Sheets

(56) References Cited

U.S. PATENT DOCUMENTS

| | | | | |
|---|---|---|---|---|
| 3,894,570 A | * | 7/1975 | Reynolds | 411/333 |
| 3,951,759 A | | 4/1976 | Studer | |
| 5,417,776 A | * | 5/1995 | Yoshino et al. | 148/318 |
| 5,419,948 A | * | 5/1995 | Yoshino et al. | 428/216 |
| 5,460,875 A | * | 10/1995 | Yoshino et al. | 428/332 |

FOREIGN PATENT DOCUMENTS

| | | |
|---|---|---|
| DE | 19929090 | 12/2000 |
| DE | 10121593 | 11/2002 |
| DE | 102004054193 | 6/2006 |
| DE | 202009011665 | 1/2010 |
| EP | 0761844 | 3/1997 |

* cited by examiner

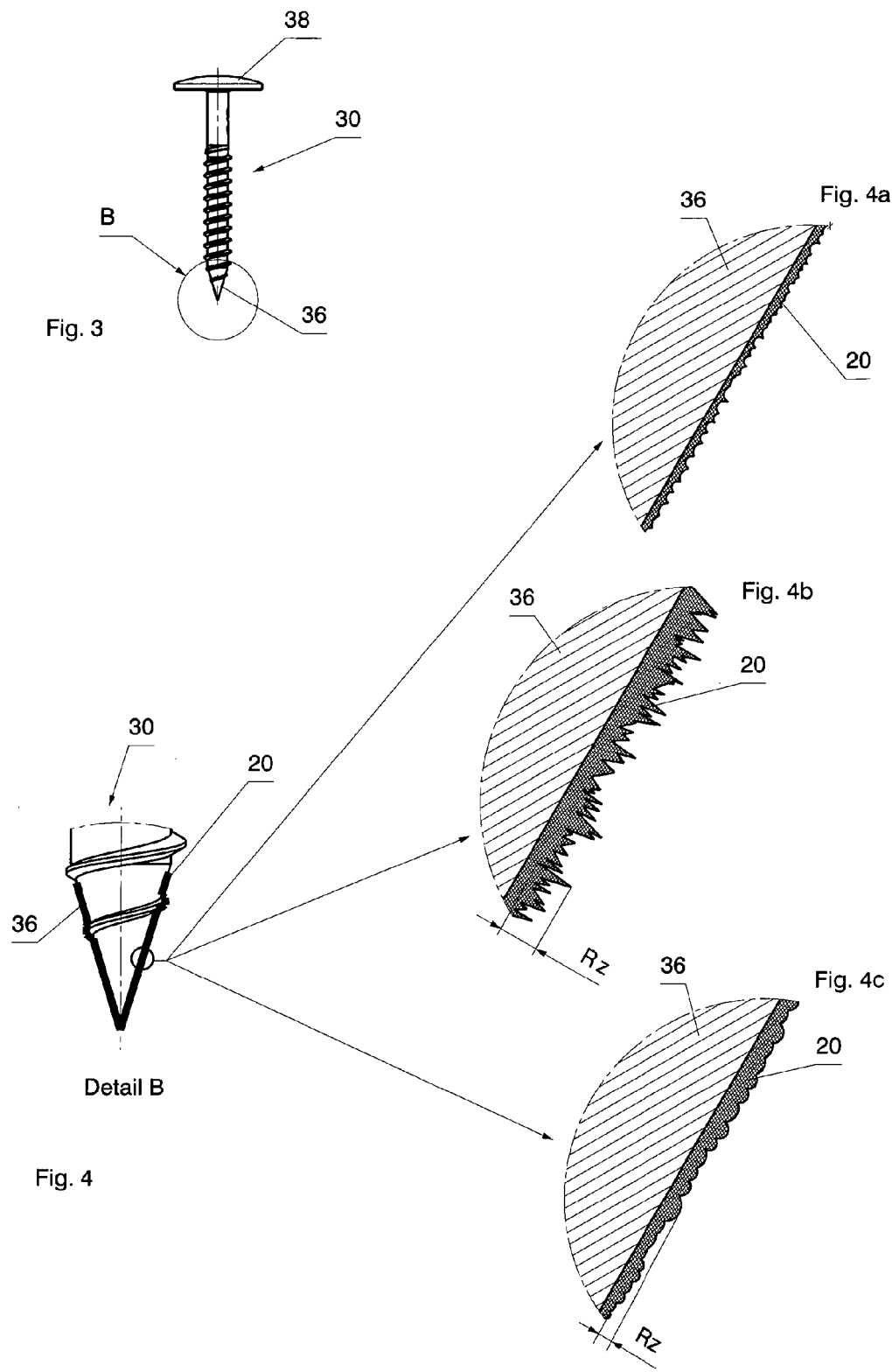

Fig. 5
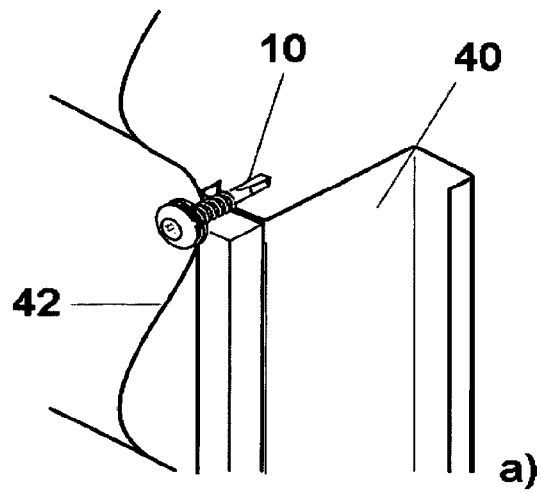
a)
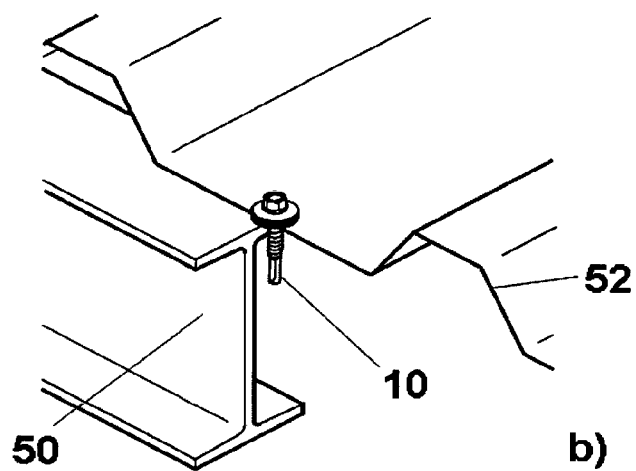
b)
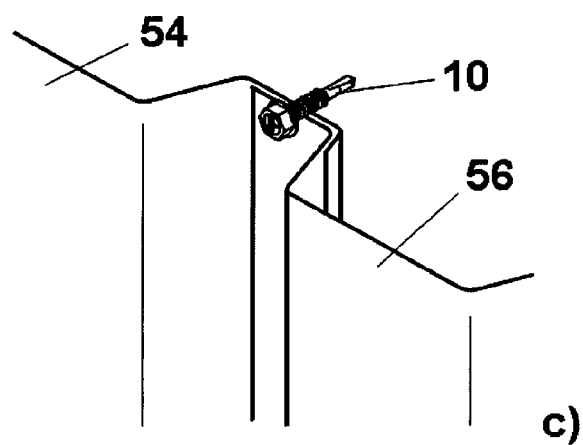
c)

SELF-DRILLING SCREW AND USE THEREOF

BACKGROUND

The invention relates to a self-drilling screw produced from an austenitic or other stainless steel, comprising a shank having a thread-forming region and a drilling or penetrating tip.

A drilling tip of the aforementioned type is known from DE 20 2009 011 665 U1, which relates to a screw having at least a hard drilling tip and a hard threaded zone and consisting of one piece of austenitic, martensitic or ferritic stainless steel or stainless duplex steel, at least the drilling tip and the threaded zone being case hardened. Self-drilling screws of the aforementioned type have becomes accepted as economical fasteners in many fields, since they do away with the work step of pre-drilling because constructional steels with a thickness of more than 10 mm are drilled through by hardened self-drilling screws, the thread then immediately being cut and the screw fastened. Self-drilling screws which are used outdoors, that is, in the region of a building cladding, for example, where they are exposed to severe weather conditions and moisture, are additionally subject to high corrosion-resistance requirements. With self-drilling screws made of stainless V2A or V4A qualities, insufficient hardness is initially achieved in the basic structure—at least on the screw surface. Although the corrosion properties are a permanent safety factor for screw connections, screws made from stainless steel cannot be used for drilling operations in for example constructional steels without additional measures owing to their properties resulting from heat treatment.

In order to take account of market requirements, owing to this aforementioned starting point in terms of material, self-drilling screws made of high-grade steel were developed, which are or were very complex to produce or had at least one serious drawback.

A basic production principle, which is predominantly applied nowadays, involves the production of a two-part screw, the two parts of which are welded together. This is a very complex process before a drilling tip and the thread can be attached. In one configuration, the drilling tip and the thread-forming region consist of carbon steel, finished by induction- or flame-hardening for example.

To avoid these drawbacks, the aforementioned document seeks to produce a stainless high-grade steel self-drilling screw made of a single piece. This special high-grade steel self-drilling screw has at least a hard drilling tip and a hard threaded zone, which are each case hardened. It is seen from the related detailed description in this document that this type of production is too complex.

Other known methods are mentioned in this document, such as hard chromium plating, chemical nickel plating and chromising. However, these methods fell short of meeting one or more of the following essential general requirements such as suitability for mass-produced articles, both in process terms and with regard to cost aspects (technical complexity and duration of the method), environmental compatibility of the coat, technological suitability of the method for self-drilling screws in terms of the coating thickness that can be achieved, and in consideration of the strength of the base material of the self-drilling screw. In justification of the last-mentioned aspect (insufficient strength of the base material), it is stated that, despite extremely hard coatings of over 1000 HV, what is known as the "eggshell effect" occurs, whereby the coating is indented and thus becomes ineffective. The coat or coating thus cannot bring its strength properties to the application as a self-drilling screw. Lastly, aside from the self-drilling screw described as novel in the document, in which at least the drilling tip and threaded zone are case hardened, it has to date not been possible to develop a self-drilling screw which consists of a single rust-resistant material and of which the drilling tip and thread-forming region are sufficiently hard for drilling into constructional steel and are still corrosion-resistant to the required degree.

In light of this, industry still prefers rust-resistant self-drilling screws produced in two pieces and finally welded. Unfortunately, this type of self-drilling screw is complex and very costly to produce. Furthermore, it is necessary that the tip, which consists of a rusting material and is welded to the shank made of rust-resistant material, is no longer in engagement once the self-drilling screw has been set. Specifically, the drilling tip can rust away over time and thereby impair the connection produced. In addition, such known two-piece self-drilling screws are always oversized because they are only used once. On the other hand, however, a self-drilling screw of this type, which is not intended to obtain its stability through case hardening, cannot be produced from one piece, because experts unanimously feel that it is not possible to drill into steel using a fastener which consists of just one rust-resistant base material.

Although the option does indeed already exist to coat rust-resistant, single-piece self-drilling screws, according to the aforementioned document, DE 20 2009 011 665 U1, it has not yet been possible to develop such a self-drilling screw of which the drilling tip and the thread-forming region are sufficiently hard for drilling into constructional steel and are still corrosion-resistant to the necessary degree.

Abrasion- and high surface pressure-resistant hard-material coats have indeed been successfully produced on flexible substrates, as indicated by DE 10 2004 054 193 A1. However, these are clearly neither suitable nor intended for use in self-drilling screws. In addition, production of the hard-material coat is complex, since the coat has to consist of at least two morphologically different layers, the first layer, which lies directly on the substrate surface, being a metal or ceramic hard coating and the outermost layer being a hard coating of amorphous carbon.

A similar solution is offered by EP 0 761 844 B1, which discloses a method for galvanic chromium plating. This method follows a method known from another document, DE 25 02 284 C2, for the galvanic deposition of chromium coatings using a galvanic chromium plating bath. According to this last-mentioned document, glossy to metallic grey chromium coatings having a pearl-like surface with a hardness of up to approximately 1500 HV can be achieved using such a chromium plating bath. These chromium coatings with the trade name "DURALLOY" are characterised by both high wear resistance and favourable friction properties, since the homogenous spherical surface promotes wettability and thus the formation of a stable oil film. The aforementioned document EP 0 761 844 B1 aims to improve the known chromium coating to the extent that said coating has high wear resistance with low frictional values, even without lubricants. This is achieved in that the pearl-like or columnar surface of the hard chromium coating is filled up and smoothed by galvanically applied black chromium. This black chromium is applied at a coating thickness of at least 1 µm and preferably of from approximately 2 µm to approximately 6 µm. This ensures that the pearl- or column structure of the hard chromium coating is completely or largely covered. Both documents are thus clearly concerned with improving the lubrication properties and not with improving the stability, as would be necessary if such a coating were to be applied to self-drilling screws.

DE 199 13 273 C2 and DE 199 29 090 A1 do indeed respectively disclose methods for producing pearl chromium coatings on workpieces made of metal, in particular steel, and for coating a workpiece with a lubricant. However, in both cases workpieces are coated and not, for example, tools used to cut or drill such workpieces. The method according to the aforementioned document, DE 19 929 090 A1, also draws on the German patent DE 25 02 284, already cited above, in the production of a first coating. A molybdenum-sulphide-based lubricant is then applied thereto and fills up and smooths the pearl-like or columnar surface.

Furthermore, DE 101 21 593 A1 discloses a method for coating workpieces with a bearing metal. The hard chromium coating is in this case produced on a workpiece and not on a cutting tool. As a result, different parameters are important for the hard chromium coating. These parameters include the pearl-like structure being more or less regular and having a surface roughness which is at least 1 μm and up to 5 μm. The hard chromium coating is then covered with a silver coating, which smooths the hard chromium coating. The silver coating is used as a replacement for the molybdenum sulphide coating (mentioned above in a different context), which is applied in order to improve the lubrication properties. In the present case, a bearing metal, i.e. a bearing material which is subject to completely different requirements to those placed on a bit, is produced by coating the hard chromium coating with silver.

Finally, DE 32 35 447 A1 discloses a cold-forged self-drilling screw made of a rust-free austenitic steel for forming a drill portion, a thread portion and a screw head, the drill portion and the thread portion undergoing case hardening.

SUMMARY

It is an object of the invention to provide a more simply producible self-drilling screw, which maintains the desired corrosion resistance despite being producible at lower cost.

Proceeding from a self-drilling screw of the type mentioned at the outset, this object is achieved according to the invention in that the shank integrally is formed of an austenitic or other stainless steel and is provided with a galvanically applied thin coating at least in the region of the tip, whereby the region provided with the coating is harder than a non-coated region, the thin coating having
   a pearl-like or columnar surface,
   a coating thickness of at least 2 μm, a coating thickness of up to 30 μm preferably being provided, and
   a hardness in a range of from 500 to 1500 HV0.3.

The invention thus provides a completely austenitic self-drilling screw having a coat. The self-drilling screw is formed only of a base material. The base material is austenitic (rust-resistant). The coat applied according to the invention ensures drilling capacity and thread formation. Expert opinion to date has had it that it is not at all possible to drill using a fastener made of a rust-resistant base material. The self-drilling screw according to the invention has a tip which can be produced when the thread-forming region is rolled. The self-drilling screw according to the invention has a simpler construction than the known two-piece self-drilling screw, because at least the welding process is omitted. The self-drilling screw according to the invention no longer has to be moulded in up to the rust-free region, because the tip is rust-resistant anyway. In principle, no part of the self-drilling screw becomes rusty. In addition, the self-drilling screw can be shorter, because it no longer has to be moulded in up to the rust-free region. Along with the lower production costs, the corrosion resistance of the self-drilling screw according to the invention is a further advantage.

The invention further provides for the use of a self-drilling screw according to the invention for connecting at least two components which are to be fastened to one another and one of which is exposed to the weather.

Advantageous embodiments of the self-drilling screw according to the invention and of the use of a self-drilling screw according to the invention form the subject matter of the dependent claims.

In one embodiment of the self-drilling screw according to the invention, the galvanically applied thin coating is a hard chromium coating, in particular according to DE 25 02 284. This German patent mentions covering hardnesses of up to 1000 Vickers and a bath composition which produces chromium coatings that are well suited to improving the service life of cutting tools. Research has shown, however, that this is not the case for self-drilling screws. Specifically, these require a higher chromium coating thickness. The chromium coating thickness of the self-drilling screw according to the invention, which thickness reaches up to 30 μm (at the foremost tip), with a hardness in a range of up to 1500 HV0.3, has proven to be sufficient. The self-drilling screw according to the invention is only ever used once, and the chromium coating has proven to be stable for the one-time drilling operation required therefore.

In another embodiment of the self-drilling screw according to the invention, the galvanically applied thin coating has an inherent roughness of 0.5 μm. This inherent roughness is one of the key factors determining the good cutting performance achieved by the self-drilling screw according to the invention.

In another embodiment of the self-drilling screw according to the invention, the galvanically applied thin coating withstands a surface pressure of up to 3.0 GPa. The pearl structure of the surface increases the surface area and thereby reduces the specific surface pressure such that the value achieved in this embodiment of the invention is sufficient for absorbing a surface compression of up to 3.0 GPa.

In another embodiment of the self-drilling screw according to the invention, the galvanically applied thin coating withstands a dynamic load of up to 3.5 MPa. This too is a result of the reduction of the specific surface load owing to the increase of the surface area by means of the pearl-like or columnar structure and, furthermore, a result of the greater coating thickness according to the invention of the self-drilling screw of up to 30 μm.

In one embodiment of the use of the self-drilling screw according to the invention, the components that are to be fastened to one another are component parts of a building cladding. This is a particularly preferred field of use for the self-drilling screw according to the invention, for which said self-drilling screw is specially designed and particularly suitable.

BRIEF DESCRIPTION OF THE DRAWINGS

Embodiments of the invention will be described in more detail below with reference to the drawings, in which:

FIG. 3 is a side view of a second embodiment of a self-drilling screw according to the invention which is provided with a penetrating tip;

FIG. 4 shows a detail, on a larger scale, of the self-drilling screw according to FIG. 3 and also, on a much larger scale in FIGS. 4a, 4b and 4c, three possible formations of a thin coating galvanically applied to the drilling tip, more specifically the surface of the thin coating having a structure which is inwardly pearled in FIG. 4a, jagged in FIG. 4b and outwardly pearled in FIG. 4c; and FIG. 5 shows three possible uses of the self-drilling screw according to the invention, more specifically in fastening corrugated metal to vertical beams of a building façade in FIG. 5a, in fastening a trapezoidal metal sheet to a double-T beam in FIG. 5b, and in producing a mutual connection between two overlapping trapezoidal metal sheets in FIG. 5c.

DETAILED DESCRIPTION OF THE PREFERRED EMBODIMENTS

Figure 1:
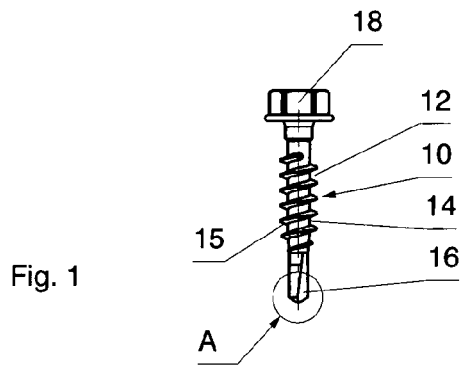
FIG. 1 is a side view of a first embodiment of a self-drilling screw according to the invention which is provided with a drilling tip.

FIG. 1 shows a first embodiment of a self-drilling screw 10 according to the invention, which is integrally produced from an austenitic or other stainless steel. The self-drilling screw 10 has a shank 12 having a thread-forming region 14, i.e. a thread-cutting or thread-tapping region, a drilling tip 16 and a head 18. The head 18 is a typical hex head. Nevertheless, the head 18 can have any given head shape. The surface of the shank 12 is harder in the region of the drilling tip 16 and at least at the transition into a thread 15 than the rest of the self-drilling screw 10. This harder formation of the surface is important for the self-drilling screw 10 to be able to carry out its function, namely to drill a hole using the drilling tip 16 and then to form a thread in the hole. The austenitic or other stainless steel of which the self-drilling screw is formed would by nature not be suitable to do this. Such self-drilling screws have to be able to drill a hole in constructional steel and to then tap a thread. A self-drilling screw made of austenitic or other stainless steel would be too soft for this purpose.

The prior art outlined at the outset suggests fulfilling this purpose by case hardening the self-drilling screw at least in the region of the drilling tip. In this case, use is not made of this option in order to design the shank 12 to be harder at the surface, at least in the harder region, than the rest of the screw.

Figure 2:
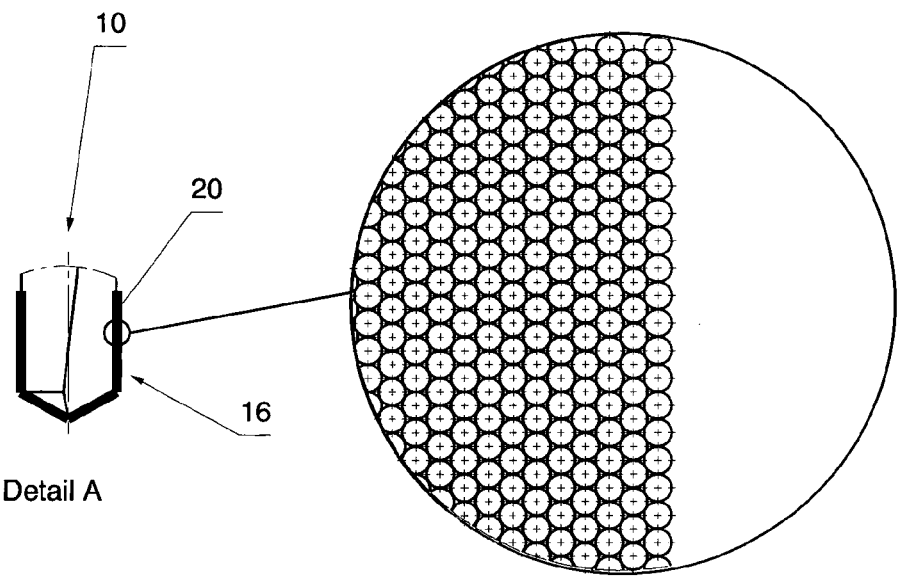
FIG. 2 is a plan view, on a larger scale, of a detail of the drilling tip of the self-drilling screw according to FIG. 1 and also, on a much larger scale, of a region of the surface of the drilling tip in the region of the detail.

In the self-drilling screw 10, the shank 12 is formed integrally of an austenitic or other stainless steel and is provided with a galvanically applied thin coating 20 (FIG. 2) in the harder region. FIG. 2 shows as a detail A the drilling tip 16 of the self-drilling screw 10 on an enlarged scale. At the same time, FIG. 2 shows as a detail the surface of the drilling tip 16 on a significantly larger scale. It can be seen that the thin coating 20 has a pearl-like or columnar surface. The pearl or columnar structure produces a surface having a surface area that is at least 50% larger than a smooth surface. On the basis of the formula P=F/A, it can be shown that when the surface area A is increased, the surface area load P of the surface area F can be reduced. Measurements have shown that the coating 20 has a thickness of at least 2 μm and preferably of up to 30 μm. The maximum value of 30 μm was measured at the foremost tip in the region of the drilling tip 16. Measurements have further shown that the self-drilling screw 10 has a hardness in a range of from 500 to 1500 HV0.3 in the region in which it is provided with the coating 20, in other words where it is harder.

In the embodiment of the self-drilling screw according to the invention, as described and shown here, the galvanically applied thin coating 20 is a hard chromium coating, in particular according to DE 25 02 284. This German patent relates to a galvanic chromium plating bath and to a method for galvanically depositing chromium coatings using said bath. Reference is made to the disclosure of this German patent for the details. In order to clarify and better explain the invention, however, some additional factors will now be examined with reference to this German patent. The German patent does indeed mention that a bath composition, as set out in the embodiment in the German patent, produces chromium coatings which are well suited to improving the service life of cutting tools. However, the German patent is thus mainly concerned with using the obtained pearl-like structure of the chromium coating, which structure depends solely on the surface quality of the base material and the covering current densities and has very good friction properties. This points to the use of the chromium coating according to the German patent as a bearing material. However, the German patent also states that the chromium coating has very good adhesive properties on the base material. According to the information in the German patent, the maximum chromium coating thickness is in the range from 5 to 10 μm.

A person skilled in the art knows that the stability of a coating deposit on the cutting edge of a cutting tool is improved when the coating thickness is increased. A person skilled in the art also knows, however, that the effect known as the eggshell effect (hard shell, soft core) can occur when a hard coating is applied to a soft base material (such as stainless steel), i.e. the hard coating breaks when loaded. This is particularly true when very hard coatings such as PVD coats are used. Very hard coatings of this type are not necessary with the self-drilling screw according to the invention. More important are the coating thickness, the stability achieved thereby and the inherent adhesiveness of coating. Simple coating processes such as chromating or hard chromium plating are sufficient to be able to use a tool such as the self-drilling screw 10 at least once, albeit with suitable additives. Contrary to the opinion of a person skilled in the art, such coats can be achieved without the occurrence of the eggshell effect.

Measurements have further shown that in the case of the self-drilling screw 10, the galvanically applied thin coating 20 has an inherent roughness of 0.5 μm. This will be discussed in more detail with reference to FIGS. 3 and 4.

Furthermore, measurements have shown that in the case of the self-drilling screw 10, the galvanically applied thin coating 20 withstands a surface pressure of up to 3.0 GPa and a dynamic load of up to 3.5 MPa.

As a second embodiment of the invention, FIG. 3 shows a self-drilling screw 30 having a penetrating tip 36. Otherwise, the self-drilling screw 30 differs from the self-drilling screw 10 only in that it comprises a flat mushroom head which is provided with an internal tool engagement portion (for example Torx) (not visible in FIG. 3).

FIG. 4 shows the penetrating tip 36 as a detail on a larger scale. Otherwise, all the above configurations relating to the self-drilling screw 10 also apply in the same manner to the self-drilling screw 30.

FIG. 4a to 4c are three sectional views in detail B of three possible formations of the coating 20, more specifically, the coating 20 having an inwardly pearled surface in FIG. 4a, the coating 20 having a jagged surface in FIG. 4b and the coating 20 having an outwardly pearled surface in FIG. 4c. The formation of the coating 20 according to the view in FIG. 4c has proven to be the most expedient. The inherent roughness of the coating 20, denoted by Rz, is 0.5 μm in the formation according to FIG. 4c. In the formation according to FIG. 4b, the value of Rz is significantly greater.

In the formation according to FIG. 4c, coating thickness measurements carried out on the self-drilling screw 30 have given values of from 2-4 μm in the head region, 3-6 μm in the thread region and 8-10 μm in the region of the drilling tip, but 15-30 μm at the foremost tip.

A preferred use of the self-drilling screw 10 or 30 is for connecting at least two components which are to be fastened to one another and of which one is exposed to the weather. The components to be fastened together can be component parts of a building cladding. Three examples thereof are shown in FIG. 5. In FIG. 5a-5c, the self-drilling screw is denoted by 10 in each case. It could also of course be the self-drilling screw 30. In FIG. 5a, the two components to be fastened together are a vertical façade beam 40 and a corrugated metal sheet 42. In FIG. 5b, they are a double-T beam 50, which may for example be part of a roof substructure, and a trapezoidal metal sheet 52. In FIG. 5c, they are two trapezoidal metal sheets 54 and 56 which are fastened to one another in their overlapping region by the self-drilling screw 10.

The entire content of the disclosure of DE 25 02 284 forms part of the present application. A full copy of DE 25 02 284 is therefore annexed to this description as Annex I and to be regarded as part thereof.

LIST OF REFERENCE NUMERALS

10 self-drilling screw
12 shank
14 thread-forming region
15 thread
16 drilling tip
18 head
20 coating
30 self-drilling screw
36 penetrating tip
38 head
40 façade beam
42 corrugated metal sheet
50 double-T beam
52 trapezoidal metal sheet
54 trapezoidal metal sheet
56 trapezoidal metal sheet

The invention claimed is:

1. A self-drilling screw comprising a shank having a thread-forming region and a drilling or penetrating tip, the shank and the drilling or penetrating tip formed (12) integrally of an austenitic or other stainless steel, a galvanically applied thin coating (20) at least in a region of the tip, the region provided with the coating (20) is harder than a non-coated region, the thin coating (20) including:
 a beaded or columnar surface,
 a coating thickness of at least 2 μm, and
 a hardness in a range of from 500 to 1500 HV0.3.

2. The self-drilling screw according to claim 1, wherein the galvanically applied thin coating (20) is a hard chromium coating.

3. The self-drilling screw according to claim 1, wherein the galvanically applied thin coating (20) has an inherent roughness of 0.5 μm.

4. The self-drilling screw according to claim 1, wherein the galvanically applied thin coating (20) is adapted to withstand a surface pressure of up to 3.0 GPa.

5. The self-drilling screw according to claim 1, wherein the galvanically applied thin coating (20) is adapted to withstand a dynamic load of up to 3.5 MPa.

6. The self-drilling screw of claim 1, wherein the coating thickness is up to 30 μm.

7. A method of connecting at least two components using the self-drilling screw (10, 30) according to claim 1, comprising rotating the self-drilling screw so that the drilling or penetrating tip cuts through the components, and continuing to rotate the self-drilling screw such that the thread forming region engages the at least two components for connecting the at least two components (40, 42, 50, 52, 54, 56) to one another, one of which is exposed to the weather.

8. The method according to claim 7, wherein the components (40, 42, 50, 52, 54, 56) to be fastened to one another are components of a building cladding.

\* \* \* \* \*